United States Patent
Ohmori et al.

(10) Patent No.: US 8,956,781 B2
(45) Date of Patent: Feb. 17, 2015

(54) FUEL CELL INCLUDING A CATHODE COMPRISING A SUB PHASE COMPOSED OF TRICOBALT TETROXIDE

(75) Inventors: Makoto Ohmori, Nagoya (JP); Ayano Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 239 days.

(21) Appl. No.: 13/614,520

(22) Filed: Sep. 13, 2012

(65) Prior Publication Data

US 2013/0095410 A1    Apr. 18, 2013

(30) Foreign Application Priority Data

Oct. 14, 2011  (JP) .................................. 2011-227417
May 18, 2012  (JP) .................................. 2012-114590

(51) Int. Cl.
*H01M 8/10* (2006.01)
*H01M 4/90* (2006.01)
*C04B 35/01* (2006.01)
*H01M 8/12* (2006.01)

(52) U.S. Cl.
CPC .............. *H01M 4/9033* (2013.01); *C04B 35/01* (2013.01); *Y02E 60/525* (2013.01); *H01M 2008/1293* (2013.01); *C04B 2235/3213* (2013.01); *C04B 2235/3215* (2013.01); *C04B 2235/3272* (2013.01); *C04B 2235/3275* (2013.01); *C04B 2235/3277* (2013.01); *C04B 2235/441* (2013.01); *C04B 2235/80* (2013.01); *Y02E 60/50* (2013.01)
USPC ........................................... 429/485; 429/483

(58) Field of Classification Search
USPC ......... 429/410, 496, 533, 485, 483, 482, 523; 427/115

See application file for complete search history.

(56) References Cited

U.S. PATENT DOCUMENTS

2009/0011323 A1    1/2009  Guan et al.
2009/0061279 A1*   3/2009  Larsen ........................... 429/33

FOREIGN PATENT DOCUMENTS

| JP | 07-267748 A | 10/1995 |
| JP | 08-236138 A | 9/1996 |
| JP | 08-259346 A | 10/1996 |
| JP | 2002-367615 A | 12/2002 |
| JP | 2006-032132 A | 2/2006 |
| JP | 2007-200693 A | 8/2007 |
| JP | 2009-16351 A | 1/2009 |
| JP | 2010-225363 A | 10/2010 |
| JP | 2011-105582 A | 6/2011 |
| JP | 2011-150813 A | 8/2011 |

* cited by examiner

*Primary Examiner* — Kenneth Douyette
(74) *Attorney, Agent, or Firm* — Global IP Counselors, LLP

(57) ABSTRACT

A fuel cell includes an anode, a cathode and a solid electrolyte layer. The cathode has a main phase and a sub phase. The main phase is composed of a perovskite type oxide including cobalt. The sub phase is composed of tricobalt tetroxide. The solid electrolyte layer is disposed between the anode and the cathode. An area occupancy of the sub phase in a sectional surface of the cathode is equal to or less than 9.8%.

6 Claims, 4 Drawing Sheets
(1 of 4 Drawing Sheet(s) Filed in Color)

FUEL CELL INCLUDING A CATHODE COMPRISING A SUB PHASE COMPOSED OF TRICOBALT TETROXIDE

BACKGROUND

1. Technical Field

The present invention relates to a solid-oxide fuel cell.

2. Description of the Related Art

In recent years, fuel cell stacks have attracted attention in light of effective use of energy resources and environmental problems. A fuel cell stack includes a fuel cell and an interconnector. The fuel cell generally includes an anode, a cathode and a solid electrolyte layer that is disposed between the anode and the cathode.

Use of a perovskite type oxide such as LSCF as the raw material powder used in the cathode for example is widely known (see, for example, JPA-2006-32132).

SUMMARY

However, the available output may be reduced during repeated power generation of the fuel cell. The present inventors gained the new insight that one cause of this reduction in output is deterioration inside the cathode, and that cathode deterioration is related to the ratio of tricobalt tetroxide introduced into an inner portion.

The present invention is based on this new insight and has the object of providing a fuel cell with enhanced durability.

A fuel cell according to the present invention includes an anode, a cathode and a solid electrolyte layer. The cathode has a main phase and a sub phase. The main phase is composed of a perovskite type oxide including cobalt. The sub phase is composed of tricobalt tetroxide. The solid electrolyte layer is disposed between the anode and the cathode. An area occupancy of the sub phase in a sectional surface of the cathode is equal to or less than 9.8%.

The present invention enables provision of a fuel cell with enhanced durability.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the attached drawings which form a part of this original disclosure.

DETAILED DESCRIPTION OF THE PREFERRED EMBODIMENTS

Figure 1:
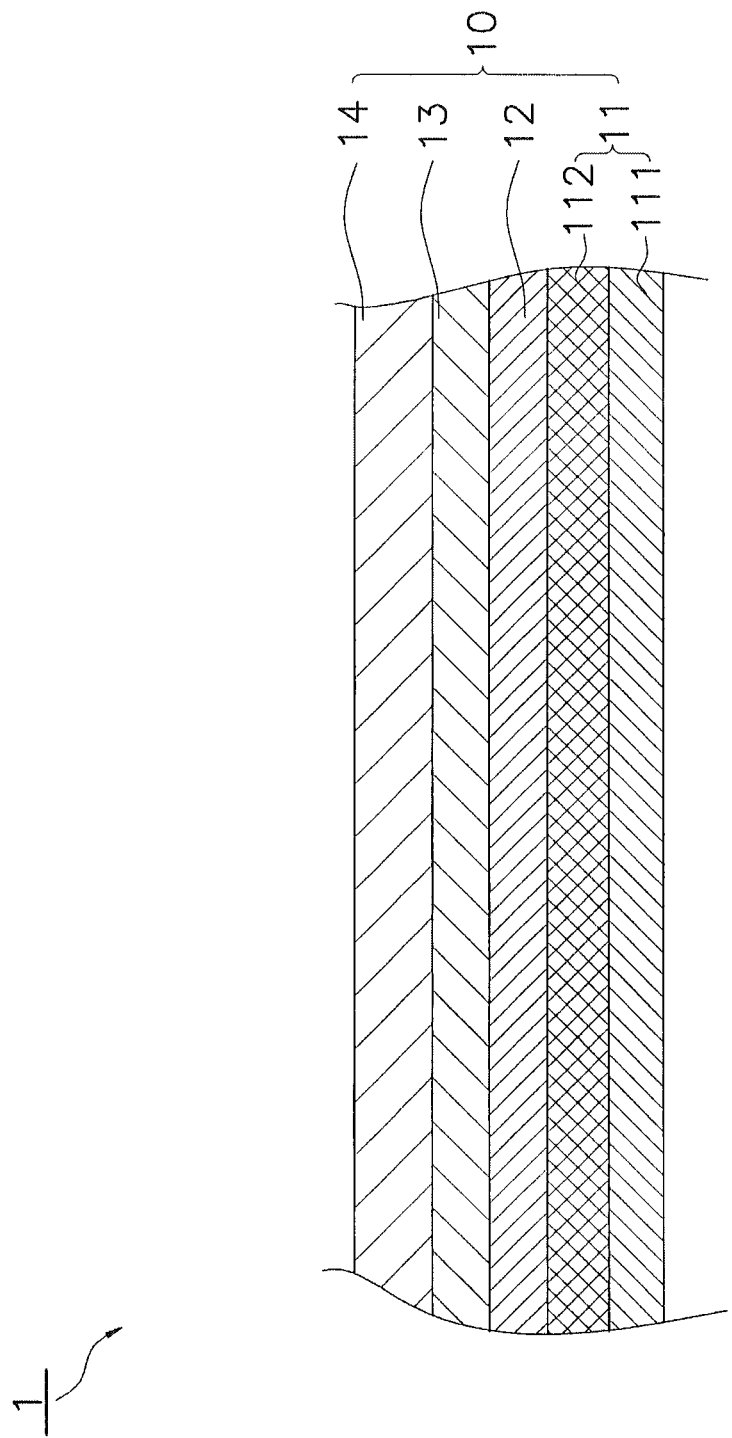
FIG. 1 is a sectional view illustrating the configuration of a fuel cell.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, a solid oxide fuel cell (SOFC) will be described as an example of a fuel cell. In the following description, although a so-called vertically-striped fuel cell is described, the invention is not limited in this regard, and may be applied to a so-called segmented-in-series fuel cell.

Configuration of Fuel Cell 10

The configuration of a fuel cell (abbreviated below to "cell") 10 will be described making reference to the figures. FIG. 1 is a sectional view of the configuration of the cell 10.

The cell 10 is a thin tabular body composed of a ceramic material. The thickness of the cell 10 is for example 300 micrometers to 3 mm, and the diameter of the cell 10 is 5 mm to 50 mm. A plurality of cells 10 is connected is series by an interconnector to form a fuel cell.

The cell 10 includes an anode 11, a solid electrolyte layer 12, a barrier layer 13 and a cathode 14.

The anode 11 includes the function of an anode of the cell 10. The anode 11 as illustrated in FIG. 1 is configured from an anode current collecting layer 111 and an anode active layer 112.

The anode current collecting layer 111 may be configured as a porous tabular fired body including a transition metal and an oxygen ion conductive material. The anode current collecting layer 111 for example may include nickel oxide (NiO) and/or nickel and yttria-stabilized zirconia (3YSZ, 8YSZ, 10YSZ, or the like). The thickness of the anode current collecting layer 111 may be 0.2 mm to 5.0 mm. The thickness of the anode current collecting layer 111 may be the largest of each constituent member of the cell 10 when functioning as a base plate. The volume ratio of Ni and/or NiO in the anode current collecting layer 111 may be 35 to 65 volume % using an Ni conversion, and the volume ratio of YSZ may be 35 to 65 volume %. The anode current collecting layer 111 may include yttria ($Y_2O_3$) in substitution for YSZ.

The anode active layer 112 is disposed between the anode current collecting layer 111 and the solid electrolyte layer 12. The anode active layer 112 is configured as a porous tabular fired body including a transition metal and an oxygen ion conductive material. The anode active layer 112 for example may include NiO and/or Ni and yttria-stabilized zirconia in the same manner as the anode current collecting layer 111. The thickness of the anode active layer 112 may be 5.0 micrometers to 30.0 micrometers. The volume ratio of Ni and/or NiO in the anode active layer 112 may be 25 to 50 volume % using an Ni conversion, and the volume ratio of YSZ may be 50 to 75 volume %. In this manner, the content ratio of YSZ in the anode active layer 112 may be greater than the content ratio of YSZ in the anode current collecting layer 111. The anode active layer 112 may include a zirconia-based material such as scandia-stabilized zirconia (ScSZ) in substitution for YSZ.

The solid electrolyte layer 12 is disposed between the anode 11 and the barrier layer 13. The solid electrolyte layer 12 has the function of enabling transmission of oxygen ions produced by the cathode 14. The solid electrolyte layer 12 includes zirconium (Zr). The solid electrolyte layer 12 may include Zr as zirconia ($ZrO_2$). The solid electrolyte layer 12 may include $ZrO_2$ as a main component. In addition to $ZrO_2$, the solid electrolyte layer 12 may include an additive such as $Y_2O_3$ and/or $Sc_2O_3$. These additives may function as a stabilizer. In the solid electrolyte layer 12, the stabilizer may have a mol composition ratio with respect to the stabilizer $ZrO_2$ (stabilizer: $ZrO_2$) of 3:97-20:80. In other words, the material used in the electrolyte layer 12 may include zirconia-based materials such as ScSZ and yttria-stabilized zirconia such as 3YSZ, 8YSZ, and 10YSZ, or the like. The thickness of the solid electrolyte layer 12 is 3 micrometers to 30 micrometers.

The barrier layer 13 is disposed between the solid electrolyte layer 12 and the cathode 14. The barrier layer 13 has the function of suppressing formation of a high resistive layer between the solid electrolyte layer 12 and the cathode 14. The material used in the barrier layer 13 includes cerium (Ce) and a ceria-based material including a rare earth metal oxide in solid solution in Ce. More specifically, the ceria-based material includes GDC ($(Ce,Gd)O_2$: gadolinium doped ceria), SDC ($(Ce, Sm)O_2$: samarium doped ceria), or the like. The thickness of the barrier layer 13 is 3 micrometers to 20 micrometers.

The cathode 14 is disposed on the barrier layer 13. The cathode 14 functions as the cathode of the cell 10. The thickness of the cathode 14 may be configured as 10 micrometers to 100 micrometers. The cathode 14 contains a perovskite type oxide including Co (cobalt) as a main phase. The perovskite type oxide including Co for example preferably includes use of SSC (samarium strontium cobalt: $SmSrCoO_3$) or the like that does not contain lanthanum or a perovskite type complex oxide that includes lanthanum, but the invention is not limited to these examples. The perovskite type complex oxide that contains lanthanum includes LSCF (lanthanum strontium cobalt ferrite), LSC (lanthanum cobaltite), or the like.

The cathode 14 includes a sub phase composed of $Co_3O_4$ (tricobalt tetroxide). The area occupancy of the sub phase in a sectional surface of the cathode 14 is preferably equal to or less than 9.8% and more preferably equal to or more than 0.32% as described below. In addition to the sub phase that is composed of $Co_3O_4$, the cathode 14 may contain an oxide that includes an element that configures a perovskite type oxide. Furthermore, the cathode 14 may contain a third phase that is configured by CoO (cobalt oxide). However, the area occupancy of the third phase in the sectional surface of the cathode 14 is preferably less than 0.10%. The area occupancy of the sub phase or the third phase in the sectional surface of the cathode 14 can be controlled by adjustment of the addition amount of an raw material additive (for example, $Co_3O_4$, CoO, or the like), the configuration (oxide or the like) or the particle diameter, and a determinative calculation is enabled by analysis of an SEM image as described below.

Microstructure of Cathode 14

In the following description, the microstructure of the cathode 14 will be described making reference to FIG. 2 to FIG. 4.

(1) SEM Image

Figure 2:
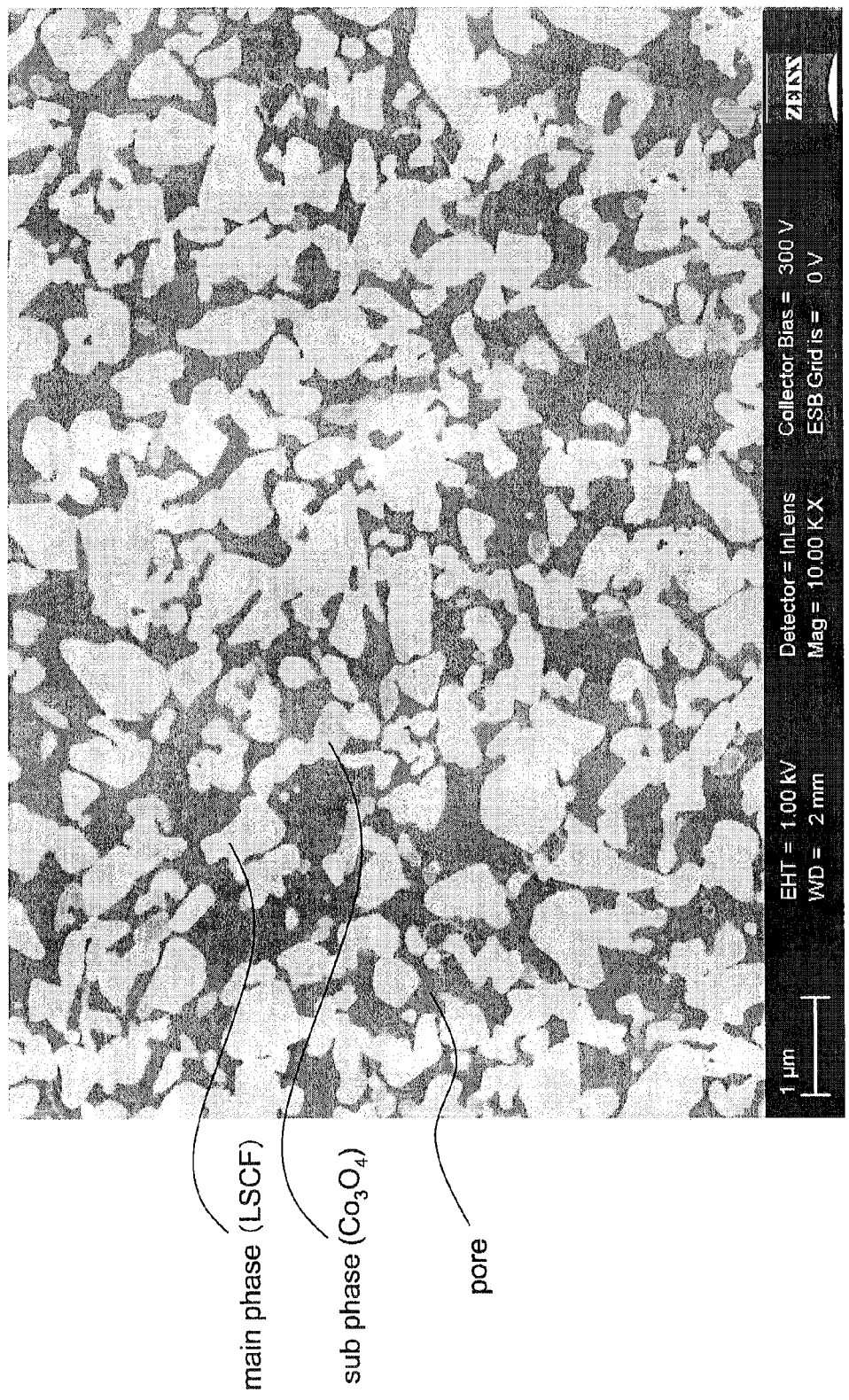
FIG. 2 is a SEM image of a section of an anode-active layer.

FIG. 2 is a sectional SEM image of the cathode 14 enlarged with a magnification of 10,000 times by a field emission scanning electron microscope (FE-SEM) using an in-lens secondary electron detector. FIG. 2 illustrates a sectional view of the cathode 14 that contains a main constituent of LSCF ($(La_{0.6}Sr_{0.4})(Co_{0.2}Fe_{0.8})O_3$). In this sectional view, after polishing with precision machinery, ion milling processing is performed using an IM4000 manufactured by Hitachi High-Technologies Corporation. FIG. 2 is an SEM image obtained by an FE-SEM (model: ULTRA55) manufactured by Zeiss AG (Germany) with a working distance setting of 2 mm, and an acceleration voltage of 1 kV.

In the SEM images, the contrast enables individual display of the main phase (LSCF), the sub phase ($Co_3O_4$) and the pores, and in FIG. 2, the main phase is displayed with a "faint gray", the sub phase with a "deep gray" and the pores with a "black". In this manner, three values assigned to the main phase, sub phase and the pores can be assigned by dividing the luminosity of the image into 256 gradations. FIG. 3 is a histogram dividing the luminosity distribution of the SEM image illustrated in FIG. 2 into 256 gradations. As illustrated in FIG. 3, the luminosity of the sub phase is detected at a low frequency from the low luminosity side of the main phase to the high luminosity side of the pores. Consequently, in FIG. 2, the sub phase is displayed at a contrast that is darker than the main phase and brighter than the pores.

However, the method of discriminating the main phase, sub phase and pores is not limited to use of contrast in a SEM image. For example, after acquisition of element mapping using SEM-EDS in the same field, three accurate values can be obtained for the main phase, sub phase and pores by checking against the FE-SEM image previously obtained by use of the in-lens secondary electron detector to thereby identify respective particles in the SEM image.

(2) Analysis of SEM Image

Figure 4:
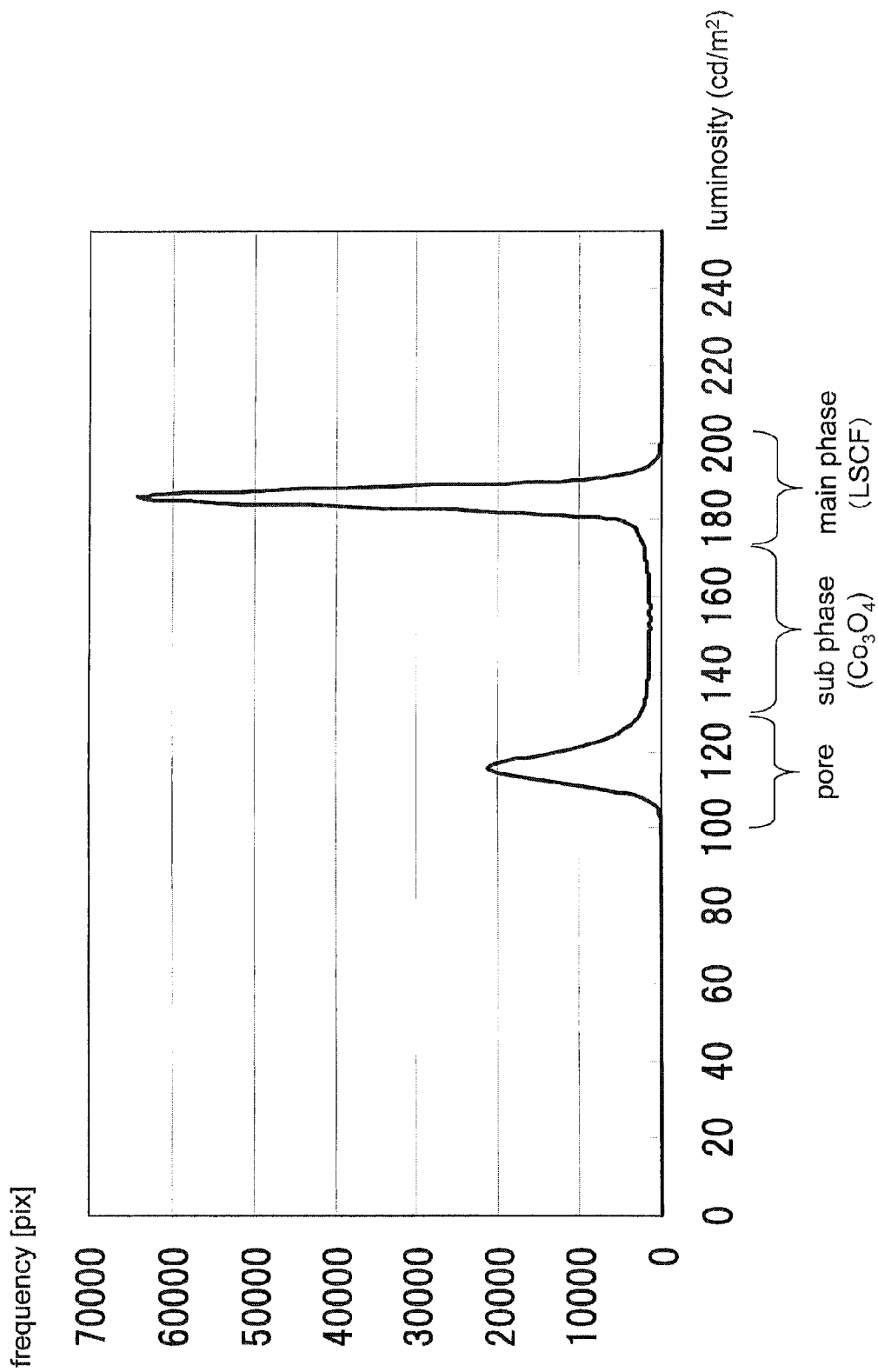
FIG. 4 illustrates the image analysis results of the SEM image illustrated in FIG. 2.

FIG. 4 illustrates the image analysis results for the SEM image illustrated in FIG. 2 using HALCON image analysis software produced by MVTec GmbH (Germany). In FIG. 4, the main phase is enclosed by the broken line and the sub phase is enclosed by the solid line.

In the sectional view of the first field illustrated in FIG. 4, the area occupancy of the sub phase is preferably equal to or less than 9.8%, and more preferably equal to or more than 0.32%. Since the inactive sections in the inner portion of the cathode are reduced when the surface area ratio occupied by the sub phase is equal to or less than 9.8%, a fall in the initial output can be suppressed, and progressive deterioration of the cathode caused by reacting the sub phase with the main phase during applying current can be suppressed. The sintering characteristics during firing of the cathode 14 are improved by configuring the area occupancy of the sub phase to be equal to or more than 0.32%, that is to say, by introducing a suitable amount of the sub phase, and thereby the scaffold of the porous structure can be strengthened. In this manner, since changes in the microstructure during applying current can be suppressed, the durability of the cathode can be improved.

Control of the area occupancy of the sub phase is possible by adjustment of the addition amount of the raw material additive that is added to the material of the cathode 14, or by adjustment of the configuration (oxide or the like) or of the particle diameter. That is to say, the area occupancy of the sub phase in the sectional surface of the cathode 14 can be determinatively calculated by analysis of an SEM image as described above and while the adjustment operation itself of the area occupancy of the sub phase is controlled by adjustment of the addition amount of the raw material additive. The raw material additive includes suitable use of an oxide powder (for example, $Co_3O_4$ powder). However in substitution for an oxide powder such as $Co_3O_4$ powder, a hydroxide powder (Co hydroxide powder or the like), a chloride powder (Co chloride or the like), or a metal powder (Co powder or the like) may be used. The addition of a metal powder promotes sintering of the cathode 14 and oxidation of the metal particles during firing of the cathode 14, and therefore enables improvement to the sintered characteristics of the cathode 14 by addition of a minute amount.

In the sectional view of the first field illustrated in FIG. 4, the average value of the equivalent circle diameter of the sub phase is preferably equal to or more than 0.02 micrometers and equal to or less than 0.3 micrometers. When the equivalent circle diameter of the sub phase is within this range, the deterioration rate of the cathode can be reduced. The equivalent circle diameter denotes the diameter of a circle that has the same surface area as the surface area of the respective regions (particles configuring the sub phase) that are enclosed by the solid line in FIG. 4. The average value is calculated by dividing the sum of the equivalent circle diameter of the total particles by the number of particles.

Extremely minute particles (for example, an equivalent circle diameter of equal to or less than 0.1 micrometers) of the sub phase can be produced by addition of microscopic raw material additive. Use of an organic compound is preferred in relation to the production of this type of sub phase. For example, a microscopic equivalent circle diameter of $Co_3O_4$ can be controlled by suitable use of cobalt di-i-propoxide (II) (chemical formula: $Co(O-i-C_3H_7)_2$) or the like as an organic metal containing cobalt. In the same manner as the addition of a metal powder, the addition of an organic metal compound enables an effect that the sintering characteristics during firing can be improved.

The average value of the equivalent circle diameter of the sub phase can be controlled by adjustment of the particle size of the raw material additive described above. The particle size adjustment of the raw material additive in relation to a powder can be configured as a precise classification including an upper limiting value and a lower limiting value by use of a pneumatic classifier.

The density of the sub phase is less than the density of the main phase. The density of the sub phase can be controlled by adjustment of the density of the raw material additive relative to the raw material of the main phase.

Method of Manufacturing Cell 10

Next, an example will be described of a manufacture method for the cell 10. However, respective conditions such as the material, the particle diameter, the temperature and the method of coating as described below may be varied as required. "Green body" below denotes a state prior to firing.

Firstly, a slurry is formed by adding polyvinyl alcohol (PVA) as a binder to a mixture of NiO powder, YSZ powder, and a pore forming agent (for example, PMMA poly(methyl methacrylate resin)). Next, the slurry is dried and granulated by use of a spray drier to form a powder for the anode current collecting layer. Then, the powder for the anode is molded using a die press molding method to form a green body for the anode current collecting layer 111.

Then, a slurry is formed by adding polyvinyl alcohol as a binder the mixture of NiO powder, YSZ powder, and a pore forming agent (for example, PMMA). The slurry is printed onto the green body of the anode current collecting layer 111 using a printing method to thereby form a green body for the anode active layer 112. The green body for the anode 11 is formed in this manner.

Next, a mixture of YSZ powder, water and a binder is mixed in a ball mill for 24 hours to prepare slurry. Then the slurry is coated on the green body for the anode 11 and dried to form a green body for the solid electrolyte layer 12. In substitution for a method of coating, a method such as a tape lamination method or a printing method may be used.

Then, a mixture of GDC powder, water and a binder is mixed in a ball mill for 24 hours to prepare slurry. Then the slurry is coated on the green body for the electrolyte film 120 and dried to form a green body for the barrier layer 13. In substitution for a method of coating, a method such as a tape lamination method or a printing method may be used.

As described above, a laminated body configured from the green body for the anode 11, the green body for the solid electrolyte layer 12 and the green body for the barrier layer 13 can be formed.

Then the laminated body is co-sintered for 2 to 20 hours at 1300 to 1600 degrees C. to form a co-fired body formed from a dense barrier layer 14, the solid electrolyte layer 12 and the anode 11 configured by the anode current collecting layer 111 and the anode active layer 112

Then, a $Co_3O_4$ powder, water and a binder is mixed with LSCF powder in a ball mill for 24 hours to prepare a slurry. The slurry is coated on the barrier layer 13 of the co-fired body and dried, and fired for one hour in an electric furnace (oxygen-containing atmosphere, 1000 degrees C.) to form the porous cathode 14 on the barrier layer 13. In this manner, the cell 10 is completed.

Other Embodiments

The present invention is not limited to the above embodiments and various modifications for changes are possible within a scope that does not depart from the spirit of the invention.

Figure 3:
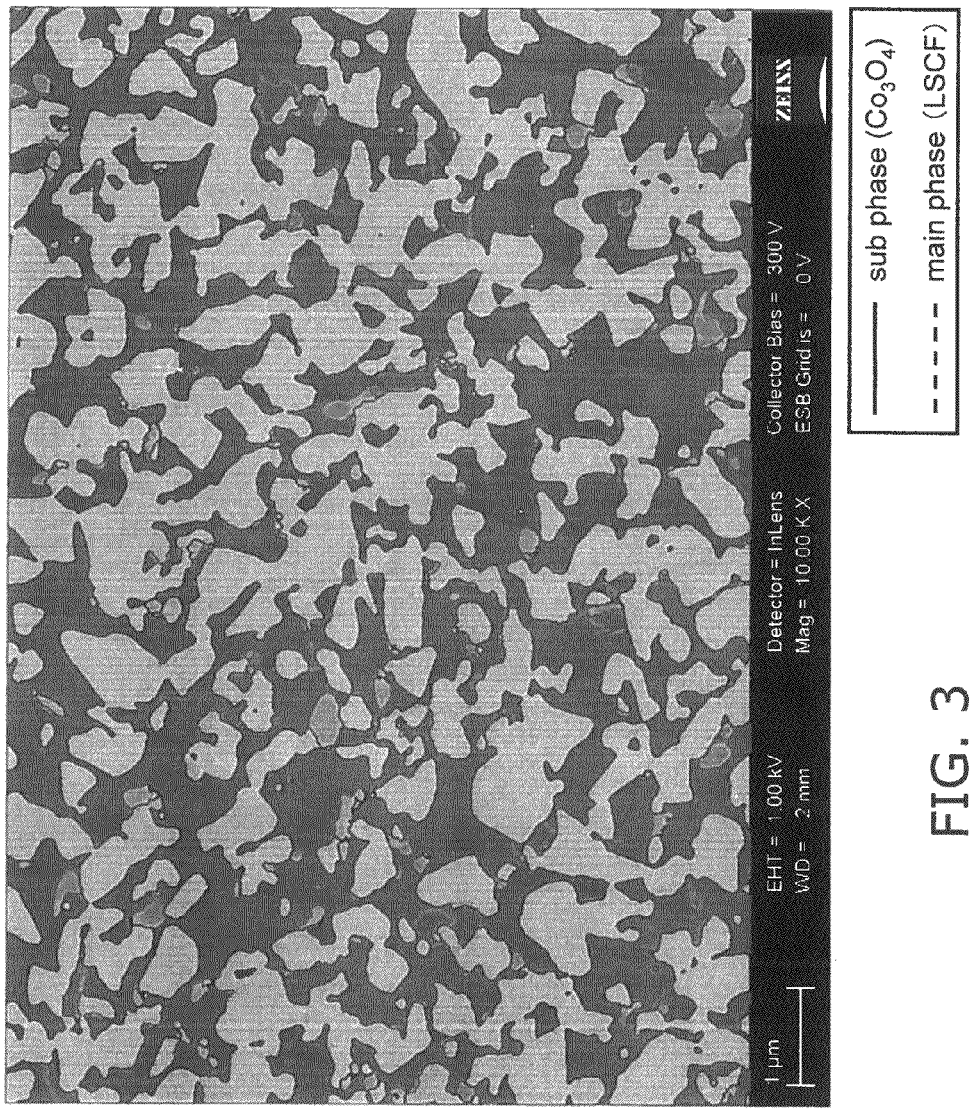
FIG. 3 is a histogram dividing the luminosity distribution in the SEM image into 256 gradations.

(A) In the above embodiment, although FIG. 2 to FIG. 4 illustrates a sectional view of the cathode 14 that includes LSCF as a main phase, the cathode 14 may include a perovskite type oxide that contains Co such as LSC (lanthanum cobaltite), SSC (samarium strontium cobaltite), or the like as the main phase.

(B) In the above embodiment, although the cell 10 includes the anode 11, the solid electrolyte layer 12, the barrier layer 13 and the cathode 14, the invention is not thereby limited. The cell 10 may include the anode 11, the solid electrolyte layer 12 and the cathode 14, and another layer may be interposed between the anode 11 and the solid electrolyte layer 12, or between the solid electrolyte layer 12 and the cathode 14. For example, the cell 10 may include a porous barrier layer between the barrier layer 13 and the cathode 14 in addition to the barrier layer 13.

(C) Although there is no particular disclosure in the above embodiment, the shape of the cell 10 may be an anode-support configuration, tabular, cylindrical, vertically striped, segmented-in-series, or the like. Furthermore, the sectional surface of the cell 10 may be oval.

The examples of a cell according to the present invention are described below. However the present invention is not limited to the examples as described below.

Examples

Preparation of Samples No. 1 to No. 37

As described below, Samples No. 1 to No. 37 of an anode support cell were prepared in which the anode current collection layer is configured as a support base plate.

Firstly, an anode current collection layer (NiO:8YSZ=50:50 (Ni volume % conversion)) having a thickness of 500 micrometers was formed using a die press molding method. In top of that layer, an anode active layer (see Table 1 below in relation to NiO:8YSZ) having a thickness of 20 micrometers was formed using a printing method.

Then, an 8YSZ electrolyte having a thickness of 5 micrometers and a GDC barrier film having a thickness of 5 micrometers were formed in series on the anode active layer to thereby form a laminated body.

The laminated body was then co-sintered for two hours at 1400 degrees C. to obtain a co-fired body. Thereafter, Samples No. 1 to No. 37 configured as an anode supporting coin cell (phi=15 mm) were prepared by forming an anode having a thickness of 30 micrometers by firing for two hours at 1000 degrees C. The Samples No. 1 to No. 18 and No. 27 to No. 33 are configured by use of LSCF as the material used in the anode, the Samples No. 19 to No. 22 and No. 34 to No. 35 are configured by use of LSC as the material used in the anode, and the Samples No. 23 to No. 26 and No. 36 to No. 37 are configured by use SSC as the material used in the anode.

The area occupancy of the sub phase composed of $Co_3O_4$ in the Samples No. 1 to No. 14 and No. 27 to No. 33 was controlled as illustrated in Table 1 and Table 2 by adjustment of the addition amount of $Co_3O_4$ powder that was added in the molding step of the LSCF anode.

The area occupancy of the third phase composed of CoO in the Samples No. 15 to No. 18 was controlled as illustrated in Table 1 by adjustment of the addition amount of CoO powder that was added in the molding step of the LSCF anode.

Observation of Sectional Surface of Anode

The sectional surface of the anode was observed in Samples No. 1 to No. 37.

More specifically, firstly, after polishing the anode of each sample with precision machinery, ion milling processing was performed using an IM4000 manufactured by Hitachi High-Technologies Corporation.

Then, an SEM image of the sectional surface of the anode enlarged by 10000 times was obtained by use of an FE-SEM using an in-lens secondary electron detector (see FIG. 2).

Then the area occupancy of the sub phase composed of $Co_3O_4$ was calculated for each sample with reference to one field of the SEM image by analysis of the sectional photograph illustrated in FIG. 2 using HALCON image analysis software produced by MVTec GmbH (Germany).

The calculation results are illustrated in Table 1 and Table 2.

Then the area occupancy of the third phase composed of CoO was calculated for Samples No. 15 to No. 18 with reference to one field of the SEM image by analysis using image analysis software. The calculation results for the area occupancy for CoO are shown in Table 1.

Durability Experiment 1

Samples No. 1 to No. 26 were heated to 750 degrees C. while supplying nitrogen gas to the anode and air to the cathode. When 750 degrees C. was reached, a reduction process was performed for three hours while supplying hydrogen gas to the anode. Thereafter, the voltage drop rate per 1000 hours for Samples No. 1 to No. 26 was measured as a deterioration rate. The output density was expressed as a value at a temperature of 750 degrees C. and a rated current density of 0.2 A/$cm^2$.

The measurement results are summarized in Table 1. In Table 1, a deterioration rate of equal to or less than 1.5% was evaluated as low deterioration.

As clearly illustrated in Table 1, the deterioration rate of the cathode could be reduced in relation to Samples No. 1 to No. 11, No. 15 to No. 21, and No. 23 to No. 25 in which the area occupancy of the sub phase configured by $Co_3O_4$ was equal to or less than 9.8%. This is due to the fact that the inactive sections in the inner portion of the cathode were reduced when the area occupancy of the sub phase was equal to or less than 9.8%, and as a result, progressive deterioration of the cathode caused by reacting the sub phase with the main phase during applying current could be suppressed.

Furthermore, when the sectional surface of the cathode was observed, the production of cracking in an inner portion of the cathode was inhibited in Samples No. 4 to No. 11, and Nos. 15, 16, 20, 21, 24, and 25 in which the area occupancy of the sub phase that is configured by $Co_3O_4$ is equal to or more than 0.32%. This is due to the fact that the sintering characteristics of the cathode 14 were improved by introducing a suitable amount of the sub phase to thereby strengthen the backbone of the porous structure.

In this manner, it is confirmed that the durability of the cathode is enhanced by controlling the area occupancy of the sub phase that is configured by $Co_3O_4$ to a suitable range.

On the other hand, in Samples No. 17 and No. 18 that contain at least 0.10% of the third phase that is composed of CoO, minute cracks were produced in an inner portion of the cathode. Therefore, it is confirmed that the area occupancy of the third phase configured by CoO is preferably less than 0.10%.

TABLE 1

| Sample | Constituent Material of Cathode | Area occupancy of $Co_3O_4$ (%) | Area occupancy of CoO (%) | Deterioration Rate (%) | Presence of minute cracks | Evaluation |
|---|---|---|---|---|---|---|
| No. 1 | LSCF | 0.12 | — | 0.5 | Yes | ○ |
| No. 2 | LSCF | 0.23 | — | 0.3 | Yes | ○ |
| No. 3 | LSCF | 0.30 | — | 0.4 | Yes | ○ |
| No. 4 | LSCF | 0.32 | — | 0.2 | No | ⊚ |
| No. 5 | LSCF | 0.65 | — | 0.5 | No | ⊚ |
| No. 6 | LSCF | 1.20 | — | 0.3 | No | ⊚ |
| No. 7 | LSCF | 1.80 | — | 0.6 | No | ⊚ |
| No. 8 | LSCF | 3.60 | — | 0.9 | No | ⊚ |
| No. 9 | LSCF | 4.80 | — | 0.8 | No | ⊚ |
| No. 10 | LSCF | 6.70 | — | 1.4 | No | ⊚ |
| No. 11 | LSCF | 9.80 | — | 1.5 | No | ⊚ |
| No. 12 | LSCF | 10.6 | — | 3.6 | No | X |
| No. 13 | LSCF | 12.5 | — | 3.5 | No | X |
| No. 14 | LSCF | 16.0 | — | 4.3 | No | X |
| No. 15 | LSCF | 1.2 | 0.06 | 0.3 | No | ⊚ |
| No. 16 | LSCF | 1.2 | 0.09 | 0.4 | No | ⊚ |
| No. 17 | LSCF | 1.2 | 0.10 | 0.3 | Yes | ○ |
| No. 18 | LSCF | 1.2 | 0.15 | 0.4 | Yes | ○ |
| No. 19 | LSC | 0.25 | — | 0.4 | Yes | ○ |
| No. 20 | LSC | 1.50 | — | 0.5 | No | ⊚ |
| No. 21 | LSC | 5.30 | — | 0.5 | No | ⊚ |
| No. 22 | LSC | 10.8 | — | 2.5 | No | X |
| No. 23 | SSC | 0.20 | — | 0.7 | Yes | ○ |
| No. 24 | SSC | 4.20 | — | 0.7 | No | ⊚ |

TABLE 1-continued

| Sample | Constituent Material of Cathode | Area occupancy of Co$_3$O$_4$ (%) | Area occupancy of CoO (%) | Deterioration Rate (%) | Presence of minute cracks | Evaluation |
|---|---|---|---|---|---|---|
| No. 25 | SSC | 6.35 | — | 0.8 | No | ⊚ |
| No. 26 | SSC | 11.0 | — | 2.3 | No | X |

Durability Experiment 2

Samples No. 27 to No. 37 were heated to 750 degrees C. while supplying nitrogen gas to the anode and air to the cathode. When 750 degrees C. was reached, a reduction process was performed for three hours while supplying hydrogen gas to the anode. Thereafter, the voltage drop rate per 1000 hours for Samples No. 27 to No. 37 was measured as a deterioration rate. The output density uses a value at a temperature of 750 degrees C. and a rated current density of 0.2 A/cm$^2$.

The measurement results are summarized in Table 2. In Table 2, a deterioration rate of equal to or less than 1.5% is evaluated as low deterioration. As clearly illustrated in Table 2, the deterioration rate can be suppressed to a sufficiently small value when the average value of the equivalent circle diameter of the sub phase that is configured by Co$_3$O$_4$ is equal to or more than 0.02 micrometers and equal to or less than 0.3 micrometers.

TABLE 2

| Sample | Constituent Material of Cathode | Area occupancy of Co$_3$O$_4$ (%) | Equivalent circle diameter (micrometers) | Deterioration Rate (%) | Evaluation |
|---|---|---|---|---|---|
| No. 27 | LSCF | 2.2 | 0.02 | 0.4 | ⊚ |
| No. 28 | LSCF | 1.8 | 0.08 | 0.5 | ⊚ |
| No. 29 | LSCF | 2.4 | 0.13 | 0.6 | ⊚ |
| No. 30 | LSCF | 0.76 | 0.26 | 0.9 | ⊚ |
| No. 31 | LSCF | 1.3 | 0.30 | 1.1 | ⊚ |
| No. 32 | LSCF | 2.3 | 0.44 | 1.8 | Δ |
| No. 33 | LSCF | 2.8 | 0.62 | 2.0 | Δ |
| No. 34 | LSC | 2.5 | 0.15 | 0.8 | ⊚ |
| No. 35 | LSC | 3.2 | 0.42 | 2.2 | Δ |
| No. 36 | SSC | 3.8 | 0.22 | 0.9 | ⊚ |
| No. 37 | SSC | 5.2 | 0.48 | 2.5 | Δ |

What is claimed is:

1. A fuel cell comprising:
   an anode;
   a cathode having a main phase and a sub phase, the main phase composed of a perovskite type oxide including cobalt, the sub phase composed of tricobalt tetroxide; and
   a solid electrolyte layer disposed between the anode and the cathode; and
   an area occupancy of the sub phase in a sectional surface of the cathode is equal to or less than 9.8%.

2. The fuel cell according to claim 1, wherein the area occupancy of the sub phase is equal to or more than 0.32%.

3. A fuel cell comprising:
   an anode;
   a cathode having a main phase and a sub phase, the main phase composed of a perovskite type oxide including cobalt, the sub phase composed of tricobalt tetroxide; and
   a solid electrolyte layer disposed between the anode and the cathode,
   an area occupancy of the sub phase in a sectional surface of the cathode being equal to or less than 9.8%, and
   an average value of the equivalent circle diameter of the sub phase in the sectional surface being equal to or more than 0.02 micrometers and equal to or less than 0.3 micrometers.

4. The fuel cell according to claim 1, wherein a density of the sub phase is less than a density of the main phase.

5. The fuel cell according to claim 1, wherein the perovskite type oxide is LSCF.

6. The fuel cell according to claim 1, wherein the cathode contains a third phase composed of cobalt oxide; and
   the area occupancy of the third phase in the sectional surface of the cathode is less than 0.1%.

* * * * *